3,192,666
METHOD OF PROTECTING FRUIT TREES AGAINST BORERS
Hans W. Sachs, 29 Virginia Ave., Binghamton, N.Y.
No Drawing. Filed May 10, 1961, Ser. No. 108,994
3 Claims. (Cl. 47—58)

This invention pertains to a method of protecting fruit trees against the encroachment of borers. In particular, the invention pertains to the protection of peach trees and the like from borers and the control of such pests by means of certain asphaltic compositions. The invention is also concerned with the production of such asphaltic compositions and their manner of application to trees.

Trees of the peach family, like many cultivated fruit trees, particularly those of the Prunus genus, characterized by a large stone in the fruit, and illustrated, aside from peach, by apricot, cherry, almond and prune trees, are subject to attack by a great variety of pests such as insects, scale, fungus and the like. However, of all these pests, probably the most destructive and difficult to control is the peach tree borer, which is the larva of a small clear-winged moth.

There are two types or species of borers which attack peach trees; the peach tree borer or larva of *Sanninoidea exitiosa*, and the lesser peach tree borer or larva of *Synanthedon pictipes*. The two types of borers, whether in the larva or adult stage, are very similar in appearance, a factor which makes their identification extremely difficult. The full-grown larvae can be distinguished by their difference in size, the peach tree borer being, of course, larger than the lesser borer. However, during the immature stages of their development, it is difficult to distinguish between the grubs. Although the two types of borers resemble each other in physical make-up, their habits and behavior are different. This variation in behavior provides the peach tree grower with a means of identifying the two species of larvae.

For the most part, the peach tree borer proper is to be found at soil level, although on occasions they are observed on the trunk and branches. A peach tree borer attacks the tree at the trunk near soil level and does not require a break or wound in the bark surface for entry. The lesser borer, on the other hand, predominates on trunk and branches. It seldom attacks sound bark, but invades the tree at a pruning scar, nick or other injury. After a borer becomes entrenched in even minor wounds, normal healing is prevented. Borers betray their presence in trees by the mixture of gum and frass which is expelled from their burrows. The indication of borer injury is most evident in the spring, when the tree wounds are "bleeding," that is, prior to the time when the foliage becomes dense.

Because peach tree borers represent such a serious menace to peach tree growers, their life history, especially in the larva and adult stage, has been extensively studied with a view to formulating a means of controlling them. In common with the biological order lepidoptera, both species of borers pass through four stages of metamorphosis: egg, larva or borer, pupa, and moth or adult. The seasonal activity of the two species is also closely related, but sufficient differences exist to affect control measures. For instance, the moth of the borer proper lays her eggs on trunks and debris near the trunk, whereas the lesser borer moth carefully places her eggs in cracks or crevices on the margin of tree wounds. The eggs of both species hatch in 10 to 14 days, and the emerging larvae immediately seek a means for gaining entrance into the tree.

The young larvae of the peach tree borer proper display pronounced tendencies to crawl down the tree to the soil level, at which point they burrow into the tree. The young lesser borers, however, migrate to the nearest injured area which offers them entrance.

The peach tree borers remain in the larva stage for the longest phase of their lives. In some instances, they feed for two seasons before completing their metamorphosis, although the majority reach development in about a year. The partially grown larvae are forced to hibernate during the winter months, a feat for which they are well adapted, since few are killed by the low temperature. With the coming of spring and when the trees begin their growth, the grubs emerge from their hibernation and begin feeding.

When the trees are in full bloom, the earliest of the lesser peach tree borers have completed their feeding and have begun their metamorphosis into the pupa stage. These emerge into adult moths late in May, although the process continues throughout the summer months.

It is not until July, however, that the peach tree borer emerges as an adult moth, and it is late August before transformation is complete. This difference in the emergence time of the two species is a highly significant factor in their life history and must be taken into consideration when timing control measures.

A study of the various entomological and pesticidal reports brings to light the rather surprising finding that progress in controlling peach borers has failed to keep pace with control of other pests. That this situation is recognized is evidenced by the Farm Research Reprint No. 194, New York State Agricultural Experiment Station at Geneva, N.Y., which states in connection with the control of peach borers: "In fact, no practical control program has been available for the lesser peach tree borer. DDT, which is reasonably effective against peach tree borers, has proved ineffective against lesser peach tree borers."

This report further mentions that there is no insecticide effective against both the species. In the search for a substance effective against both the species, only one promising material has been found, namely, Parathion. This is superior to DDT for control of the peach tree borer and is highly effective against the lesser borer. The Farm Research Reprint describes the proper timing of sprays for controlling both borers, by the use of Parathion as the active ingredient in insecticide sprays. For really effective control of the borers, particularly the lesser borer, four sprays are required for protection against both species. The four sprays must be accurately timed and spaced. Moth emergence varies with location and, since observation of this phenomenon is a matter of scientific study not suited for the average tree grower, timing in actual practice is found to be based merely on guesses. In addition, this method requires large quantities of the highly toxic Parathion with associated emulsifiers and solvents. Moreover, the high toxicity of this substance makes its storage near or about the home a distinct hazard. Aside from actually removing the worms or borers by hand, using a knife or sharp wire, the home orchardist is actually rather helpless before the onslaught of these destructive pests. About the only simple method for peach tree borer control to which the tree grower has recourse is the old PDB method (p-dichlorobenzene method) or by the relatively ineffective and expensive DDT sprays. P-dichlorobenzene is a crystalline organic compound melting at 53° C., commonly used as an antiparasitic in herbarium collections. In practicing the PDB treatment, soil temperatures should be above 60° F., since otherwise the crystals will not properly volatilize to produce the vapor which kills the borers. The customary procedure recommends leveling the soil about the base of the tree to a distance of 10 to 12 inches. The PDB crystals are then distributed in a continuous ring 2 inches from the trunk. They must not be too close, since otherwise the corrosive fumes may injure the tree, and on the other hand, if placed too far away, the material would be ineffectual. After the crystals have been applied, the ring is covered with 5 or 6 inches of fine soil in a mound about the base of the tree.

If DDT is used, three sprays are the recommended dosage; the first about the middle of July and repeated at 21 day intervals. The trunk and soil should be thoroughly wet with spray containing 1½ cups of DDT (50% wettable powder) per 5 gallons of water, or 3 pounds per hundred gallons.

It is believed to be manifest that there is still a need for an effective, economical and safe method for the control of peach borers, particularly from the standpoint of the home orchardist. I have now devised such a peach tree borer treatment and method of control, and provision of such method and control, and compositions for effecting such methods constitute the objects and purpose of this invention.

As a result of my investigations and experiments on peach trees, I have discovered that peach tree borers are either repelled or inactivated by contact with certain asphaltic materials which are obtained as a residue after removal of volatile components from petroleum. Although I have not as yet ascertained what action these asphaltic substances have on the peach tree borers, it is my belief that the pests are in some way repulsed or perhaps killed by certain components contained in the asphaltic residue. In any event, when I treat peach trees with my asphaltic compositions in a manner which will be subsequently described, the susceptibility to attack by the borers is greatly lessened and in fact reduced virtually to the vanishing point.

The petroleum residues which I have found eminently suitable for carrying out the invention, are obtained from petroleum rich in asphaltic residues and may be produced from the distillation of the petroleum by removal of volatile components.

In addition to the above described "synthetic" asphalt, i.e., the type produced by distillation of petroleums containing an asphalt base, I can also make use of the natural asphalts, the so-called asphaltums or mineral pitches. These natural asphalts are produced under certain geological conditions wherein the petroleum is not confined to underground cavities which normally prevent escape of the naphtha vapors and other petroleum solvents, but is rather found under conditions which allow for vaporization of the volatilile component, with the result that a natural residue of asphaltum or mineral pitch is thereby produced. Asphaltum or mineral pitch comprises a mixture of different hydrocarbons, part of which are oxygenated, having characteristics which are as follows: It is essentially an amorphous substance, having a density of about 1.00, and the lustre is a rather bright shiny black. Natural asphaltum melts or softens at about 90 to 112° F. and burns with a bright flame. It is soluble mostly or wholly in oil of turpentine and partly or wholly in ether; commonly, partly in alcohol. The more viscid varieties pass by insensible gradations into pit asphalt or mineral tar and through these there is a gradation back to the petroleum. The fluid kinds change into a solid by the loss of vaporization of the liquid portion and also by a process of oxidation, which consists first in the loss of hydrogen and finally in the oxidation of a portion of the mass.

In using my compositions, I find it is only necessary to apply the asphalt at those portions of the peach tree which are susceptible to attack by the borers. Since the peach tree borer proper enters the tree at or near soil level, I apply a coating of asphalt which completely encircles the trunk of the tree from a point originating at ground level to a distance of about 12 inches. It is important that the lower portion of the tree trunk be completely encapsulated or coated by the asphalt, since otherwise the borers might find open passageways and thus make their way into the cambium of the tree. Because the lesser borer seldom attacks sound bark but enters the tree at or through scars on trunks and limbs, a somewhat different mode of application of my material is necessary for counteracting these attacks. I have ascertained that the preferred method for protecting the tree against the encroachment of lesser borers consists in applying a generous coating of asphalt over the tree wound, lesion or injury, and extending the coating for a few inches in all directions about the wound. In this way, the lesser borers must move over the surrounding area of asphalt and thus are prevented from getting to the wound. It is also feasible to apply this composition so as to enter the burrows formed by the borers and thus perform its intended function.

To facilitate application of the asphalt to the tree trunk or limb, I have found it advantageous to use a solution of the asphalt in a relatively volatile and innocuous solvent. The resulting asphalt solution is then applied to the susceptible areas of the peach tree by a brushing operation or by means of spray equipment. I prefer the latter mode of application, as it is the most easy to carry out and for its execution, recommend an aerosol container. As is well known in the art, an aerosol container is typified by a heavy metal tubular body provided with a spray tip easily manipulated by the fingers. Such a container is filled with a solution of the material to be dispensed in combination with material which is normally gaseous under standard temperatures and conditions but under pressure is reduced to a liquid. These materials, when placed under pressure which prevails in the aerosol container, are readily dispensed in a convenient mist or spray. Other means which provide gaseous pressure from outside gas tanks can be used with equal success.

It has been my finding that I can employ a wide variety of solvents for forming my asphaltic compositions, the particular type of solvent being somewhat dictated by the mode of application which is desired. For instance, if it is desired to apply the solution by brush application to the tree, it is desirable to use a solvent having lower volatility than when the aerosol mode of application is employed. These lesser volatile solvents are exemplified by the saturated aliphatic hydrocarbons and in particular, those boiling from 80 to 130° C. Specific examples of such solvents include kerosene, ligroin (B.P. 90–120° C.) heptane, octane, as well as a chlorinated derivative of these hydrocarbon solvents. If the aerosol mode of application is desired, I would recommend a more volatile solvent and in this connection, mention is made of such well known solvents as pentane, hexane, the lower boiling ligroins, carbon tetrachloride and other chlorinated lower paraffinic hydrocarbons having a boiling point in the vicinity of 50 to 80° C. It is, of course, believed to be manifest that any solvents capable of effecting dissolution of the bitumen or asphalt would serve in formulating my compositions. In the last analysis, the solvent serves as a vehicle for the asphalt and it is only necessary that the solvent be capable of effecting dissolution of the asphalt, reasonably rapid evaporation, as well as being innocuous to the trees.

As already noted, I have not as yet been able to account for the effect my asphaltic compositions exert on the borers. They may be termed barriers, repellants or insecticides. But in any event, whatever the explanation may be, the asphalt serves as an effective means against attacks by the larvae, thus providing adequate protection to the trees from the onslaughts of these pests.

The following examples will illustrate my invention in greater detail, although it is to be understood, that such examples are submitted by way of illustration only and are not to be construed as placing any limitation of the invention, except as necessitated by the appended claims, on the invention.

Example 1

62 parts of an asphaltic residue having the characteristics:

| | |
|---|---|
| Spec. gravity @ 25/25° C. | 1.000 |
| Penetration: | |
| At 32° F. (100 gm.) | 10 |
| At 77° F. (100 gm.) | 144 |
| At 115° F. (100 gm.) | 235 |
| Softening point (R & B) ° F. | 114.5 |
| Spot test | Negative |
| Total bitumen, percent | 99.8 |
| Bitumen soluble in 86° Bé. naphtha | 99.9 |
| Bitumen soluble in CCl₄ | 99.9 |
| Sulphur, percent | 0.16 |
| Paraffin scale | None |
| Acid number | 0.35 |
| Test for phenolic groups | Negative | was dissolved in 38 parts of hexane and the resulting solution placed in an aerosol container in admixture with a suitable amount of a propellant such as Freon. The asphaltic composition was then applied from the aerosol container to the trunk of several peach trees, beginning at the ground level and continuing upward to a distance of approximately 12 inches. Precautions were taken to cover all nooks and crannies in the bark so that a homogeneous and continuous film of asphalt completely engirdled and coated the tree trunk and such injuries which were observed. The test was conducted in a peach tree orchard. An equal number of trees were treated with my composition and the same number of trees were not given any treatment whatsoever. The treatment may be started early in the spring but not later than the end of May. It was ascertained that none of the trees used in the test was infected by borers. Late in summer, it was observed that the untreated peach trees were infected with borers, but on the other hand, those trees receiving my asphaltic treatment were free of these pests. Since my asphaltic composition is essentially non-volatile, it remains on the tree for long periods of time and is easily effective over periods exceeding one year if the application is generous. This represents a decided advantage over the methods heretofore used, such as emulsions of DDT or Parathion, which must be applied heavily and repeatedly to the bark and limb but yet are easily washed off by rain, thus limiting their action over a relatively short period. The method herein described consequently offers a distinct economic advantage for combatting peach tree borers.

*Example 2*

The procedure as given in Example 1 was followed here except an aerosol container was not employed. The asphalt was dissolved in a medium volatile solvent represented by hexane and a mixture of hexane and heptane. The resulting asphaltic solution was painted on the tree by means of a brush. The same effectiveness, however, was obtained as with the aerosol described in the first example.

What is claimed is:

1. A method for protecting peach trees and other trees of the Prunus genus against borers, including both the species *Sanninoidea exitiosa* and the species *Synanthedon pictipes*, comprising
   - spraying under pressure an encapsulating band of a non-phytotoxic solution of asphalt in a volatile solvent around the trunk of said tree, said band at least covering the portion of said trunk adjacent the ground, and
   - spraying said solution as an aerosol under pressure over and into wounds, crotches and breaks in the bark of said tree, thereby inactivating any borers and larvae present and preventing the entry of any borers.

2. A method for protecting peach trees and other trees of the Prunus genus against borers comprising applying a non-phytotoxic solution of an asphalt in a volatile hexane solvent to those areas of the tree which are normally penetrated by the principal species of borers in such manner that said borers must contact said asphalt before they can enter the tree, said asphalt being a synthetic asphalt having the following characteristics:

| | |
|---|---|
| Spec. gravity of 25 at 25° C. | 1.000 |
| Penetration: | |
| At 32° F. (100 gm.) | 10 |
| At 77° F. (100 gm.) | 144 |
| At 115° F. (100 gm.) | 235 |
| Softening point (R & B) ° F. | 114.5 |
| Spot test | Negative |
| Total bitumen, percent | 99.8 |
| Bitumen soluble in 86° Bé. naphtha | 99.9 |
| Bitumen soluble in $CCl_4$ | 99.9 |
| Sulphur, percent | 0.16 |
| Paraffin scale | None |
| Acid number | 0.35 |
| Test for phenolic groups | Negative |

3. A method for protecting peach trees and other trees of the Prunus genus against borers, including both the species *Sanninoidea exitiosa* and the species *Synanthedon pictipes*, comprising
   - spraying under pressure an encapsulating band of a non-phytotoxic solution of asphalt in a volatile solvent around the trunk of said tree, said band at least covering the portion of said trunk adjacent the ground, and
   - spraying said solution under pressure over and into wounds, crotches and breaks in the bark of said tree, thereby inactivating any borers and larvae present and preventing the entry of any borer, said asphalt being a synthetic asphalt having the following characteristics:

| | |
|---|---|
| Spec. gravity of 25 at 25° C. | 1.000 |
| Penetration: | |
| At 32° F. (100 gm.) | 10 |
| At 77° F. (100 gm.) | 144 |
| At 115° F. (100 gm.) | 235 |
| Softening point (R & B) ° F. | 114.5 |
| Spot test | Negative |
| Total bitumen, percent | 99.8 |
| Bitumen soluble in 86° Bé. naphtha | 99.9 |
| Bitumen soluble in $CCl_4$ | 99.9 |
| Sulphur, percent | 0.16 |
| Paraffin scale | None |
| Acid number | 0.35 |
| Test for phenolic groups | Negative |

References Cited by the Examiner

UNITED STATES PATENTS

| | | | |
|---|---|---|---|
| 103,290 | 5/70 | Bowker | 106—6 |
| 1,130,545 | 3/15 | Scott | 47—25 X |
| 1,226,889 | 5/17 | Jacobs | 106—15 |
| 1,954,795 | 4/34 | Bernitz | 47—24 |
| 2,524,590 | 10/50 | Boe | 252—305 |
| 3,045,394 | 7/62 | Coulter | 47—2 X |

FOREIGN PATENTS

| | | |
|---|---|---|
| 811,418 | 1/37 | France. |
| 696,393 | 9/40 | Germany. |
| 47,984 | 5/55 | India. |

OTHER REFERENCES

Holleman, A. F., A Text-Book of Organic Chemistry, Third English Edition, N.Y., John Wiley & Sons, 1911, pages 38 and 41.

Metcalf, C. L., and Flint, W. P., Destructive and Use-

(Other references on following page)

OTHER REFERENCES ful Insects, Second Ed., N.Y., McGraw-Hill, 1939, pp. 632, 633, 634.

Abraham H., Asphalts and Allied Substances, Fifth Ed., vol. 1, pages 566–581 and Table LXX facing page 580, N.Y., Van Nostrand, 1945.

Chemical Abstracts (Magazine, 1949), vol. 43, Column 8088–E, Article, "Sprays for Control of the Peach Borer."

Sleeth, B., Pruning Wound Paint for Budded Citrus Nursery Stock Wounds, in proccedings of Ninth Annual Rio Grande Valley Horticultural Institute, January 25, 1955, published 1955 by Rio Grande Valley Hort. Club, Weslaco, Tex., vol. 9, pp. 110, 101, 102.

Perone, P. P., Tree Maintenance, N.Y., Oxford University Press, 1959, pages 80–84, 212, 213, 265.

ABRAHAM G. STONE, *Primary Examiner.*

A. JOSEPH GOLDBERG, T. GRAHAM CRAVER, *Examiners.*